US006113378A

United States Patent [19]

Tsuboi et al.

[11] Patent Number: 6,113,378

[45] **Date of Patent: *Sep. 5, 2000**

[54] MOLD FOR DRUM-SHAPED MAGNETIC CORE

[75] Inventors: Hiroshi Tsuboi; Toshinori Okamoto; Kunio Kojima, all of Shizuoka-ken, Japan

[73] Assignee: Minebea Co., Ltd., Miyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/862,703

[22] Filed: May 23, 1997

[30] Foreign Application Priority Data

Aug. 28, 1996 [JP] Japan .................................... 8-226539

[51] Int. Cl.$^{7}$ .................................... B29C 43/02

[52] U.S. Cl. ............................ 425/352; 425/78; 425/356

[58] Field of Search .................................. 425/330, 352, 425/356, DIG. 33, 78

[56] References Cited

U.S. PATENT DOCUMENTS

| | | | |
|---|---|---|---|
| 1,099,667 | 6/1914 | Ronay | 425/330 |
| 1,229,899 | 6/1917 | Darling | 425/330 |
| 2,999,271 | 9/1961 | Falk et al. | 425/352 |
| 3,720,491 | 3/1973 | Dedek | 425/352 |
| 4,153,399 | 5/1979 | DeSantis | 425/78 |
| 4,298,563 | 11/1981 | DeSantis et al. | 425/352 |

*Primary Examiner*—James P. Mackey

*Attorney, Agent, or Firm*—Oliff & Berridge, PLC

[57] ABSTRACT

A mold for molding a drum shaped magnetic core having two flanges connected by a coil winding core portion. The mold includes a die defining a cylindrical cavity having an inner diameter substantially equal to an outer diameter of the flanges. A pair of die inserts are movable in an orthogonal direction relative to the cylindrical cavity and define a diameter of the coil winding core portion of the drum shaped magnetic core. The diameter of the coil winding core portion is smaller than the outer diameter of the flanges. An upper punch and a lower punch are inserted into the cylindrical cavity from a corresponding end opening of the mold such that each forms a flange. A central punch is disposed coaxially within one of the punches to form the coil winding core portion.

10 Claims, 13 Drawing Sheets

MOLD FOR DRUM-SHAPED MAGNETIC CORE

BACKGROUND OF THE INVENTION

1. Field of Invention

The present invention relates to a mold for a drum-shaped magnetic core which is used for small inductor parts in various kind of electric appliances.

2. Description of Related Art

Generally, a drum-shaped of magnetic core is obtained by forming the general shape by compressing magnetic powder. Various grinding, horizontal compression molding, and individual compression molding and subsequent bonding processes have been used. These processes are explained below.

In a grinding process, using a powder-compressing press, the magnetic powder is formed into a round pole-like shape having a specific diameter as shown in FIG. 12. Then, and as shown in FIG. 13, the sides of the round pole-like shape are reduced using a grinding stone to form a drum-shaped magnetic core. As shown in FIG. 14, the resulting drum-shaped magnetic core has an upper flange la and a lower flange 1*b* connected by a winding core portion 2.

In the horizontal compression molding process, as shown in FIG. 15, a mold is provided having a cavity shaped to mold a drum-shaped winding core portion 2, in a horizontal posture. Magnetic powder is filled and compressed to make a drum-shaped of magnetic core in one process (lateral pushing method). However, the horizontal compression molding process, as shown in FIG. 16, produces a cut portion 1*c* on the upper flange 1*a,* a cut portion 1*d* on the lower flange 1*b* and a cut portion 2*a* on the winding core portion 2.

In the individual compression molding and subsequent bonding processes method, as shown in FIG. 17, the upper flange 1*a,* the lower flange 1*b* and the winding core portion 2 are individually formed by powder compression molding. These separately formed members are subsequently bonded together using adhesives to obtain the same structure as shown in FIG. 14.

However, the above conventional methods include the following problems respectively. First, in the case of the grinding processes, because a molded pole-like shape must be formed first, an increased volume of magnetic powder must be used. Furthermore, because the sides of the molded pole-like shape must be reduced to produce the winding core portion, numerous cutting chips are generated. These cutting chips may contaminate the manufacturing environment. Thus, economical efficiency is reduced by this method.

In the horizontal compression molding process, as shown in FIG. 15 and discussed above, cut portions 1*c,* 1*d* and 2*a* are produced. These cut portions result in a winding core portion 2 with a reduced sectional area when compared with a pole having the same diameter that does not have such a cut portion. Thus, the cut portion of the winding core portion 2 must be supplemented to increase the sectional area of the winding core portion 2. However, an increase in the sectional area of the winding core portion 2 causes a decrease in the number of windings that can be accommodated on the winding core portion 2. Thus, the overall function of the drum-shaped of magnetic core is reduced. In order to avoid this problem, various limitations on the dimensions of each portion of the drum-shaped of magnetic core must be considered.

Furthermore, burs are generated on the ends of the cut portions 1*c,* 1*d* and 2*a.* Accordingly a bur-removing process must be performed. This merely increases the number of processes steps required in the horizontal compression molding process.

Therefore, although the desired drum-shaped core can be molded using the horizontal compression molding process, an reduction in production cost could not be expected. Moreover, is impossible to arrange a horizontal compression mold to produce a drum-shaped of magnetic core having all of the various shapes of flanges illustrated in FIG. 9(*a*)–(*d*).

In the individual compression molding and subsequent bonding processes method, as shown in FIG. 17 and described above, the bonding process for each member is inevitable. The bonding process causes an increased number of processes steps and cost. Furthermore, the individual compression molding and subsequent bonding processes method results in bonded members that are easily separated due to poor bonding.

SUMMARY OF THE INVENTION

The present invention has been made in the light of the above problems and the object thereof is to provide a molding method and a mold using the same for a drum-shaped of magnetic core, which can not be limited in the shape and the dimension, can save the volume of the powder to be used and is low in the cost and is superior in the productivity.

In the molding method of a drum-shaped of magnetic core of the present invention, in a mold is provided comprising a die, divided dies, upper and lower punches and a cavity that is formed for molding a drum-shaped of magnetic core with two flanges connected and a coil winding core portion. The method begins by first filling the cavity with the magnetic powder. Next, the magnetic powder filled in the coil winding core portion is compressed in an axial direction by a central punch. The magnetic powder filled in the coil winding core portion is compressed so that compression of the powder in the lower flange portion is carried out. Then, the magnetic powder filled in the upper and lower flange portions is compressed by the punch to harden the magnetic powder. Finally, the divided dies are separated from the die in a direction perpendicular to the coil winding core portion and the compressed drum-shaped of magnetic core is released in the axial direction.

According to the present invention, the magnetic powder is filled in the cavity that is formed for the drum-shaped of magnetic core. The magnetic powder is first forced into the lower flange portion of the cavity through the coil winding core portion of the cavity by the upper central punch. The magnetic powder is forced into the cavity so as to be given a predetermined density. Additionally, a preliminary compression to the magnetic powder in the coil winding core portion is carried out. Next, the magnetic powder filled in the upper and lower flange portions of the cavity is compressed together with the magnetic powder filled in the coil winding core portion by the upper and lower punches in the axial direction. The magnetic powder is compressed so that a uniform density of magnetic powder obtained in all sections of the chamber. When the magnetic powder has been compressed to a uniform density, the divided dies that form the coil winding core portion of the mold are separated in the direction perpendicular to the coil winding core portion. Thus, the magnetic powder that has been compressed into a drum-shaped of magnetic core can be released from the mold in the axial direction.

Furthermore, to solve the above problems, the present invention provides a mold with a cavity shaped as a drum-shaped of magnetic core, in which magnetic powder is filled and compressed to a desired core shape. The mold comprises a die having a cylindrical molding portion, two divided dies that are separately movable in a direction perpendicular to the cylindrical axis of the mold. The mold further provides an abutting portion at which a small diameter cylinder portion is formed, a pair of upper and lower punches and a central punch. The upper and lower punches are insertable through the cavity of the mold from both of the opened ends of the mold. The central punch is movable vertically coaxially with at least the upper or lower punch so that the central punch can be inserted into the small diameter cylinder portion of the mold formed by the two divided dies.

BRIEF DESCRIPTION OF THE DRAWINGS

FIG. 6(*b*) is a schematic diagram showing another step of the preliminary working process for molding a drum-shaped magnetic core using the mold shown in FIG. 1;

FIG. 6(*c*) is a schematic diagram showing another step of the preliminary working process for molding a drum-shaped magnetic core using the mold shown in FIG. 1;

FIG. 6(*d*) is a schematic diagram showing yet another step of the preliminary working process for molding a drum-shaped magnetic core using the mold shown in FIG. 1;

FIG. 6(*e*) is a schematic diagram showing another step of the preliminary working process for molding a drum-shaped magnetic core using the mold shown in FIG. 1;

FIG. 6(*f*) is a schematic diagram showing a final step of the preliminary working process for molding a drum-shaped magnetic core using the mold shown in FIG. 1;

FIG. 7(*b*) is a schematic diagram showing a second step of the final working process for molding a drum-shaped magnetic core using the mold shown in FIG. 1;

FIG. 7(*c*) is a schematic diagram showing the final step of the final working process for molding a drum-shaped magnetic core using the mold shown in FIG. 1;

FIG. 8(*b*) is a schematic diagram showing a second step of a die-releasing process of the magnetic core of the processes for molding a drum-shaped magnetic core using the mold shown in FIG. 1;

FIG. 8(*c*) is a schematic diagram showing a final step of a die-releasing process of the magnetic core of the processes for molding a drum-shaped magnetic core using the mold shown in FIG. 1;

FIG. 9(*b*) shows a magnetic core having a hole at the flange using the mold for a drum-shaped magnetic core shown in FIG. 1;

FIG. 9(*c*) shows a magnetic core having a cut-out on the flange using the mold for a drum-shaped magnetic core shown in FIG. 1;

FIG. 9(*d*) shows a magnetic core having a slit on the inside face of the flange using the mold for a drum-shaped magnetic core shown in FIG. 1;

FIG. 17 is a perspective view showing a drum-shaped of magnetic core to be formed by a conventional bonding method using adhesives and so on.

DETAILED DESCRIPTION OF PREFERRED EMBODIMENTS

Figure 1:
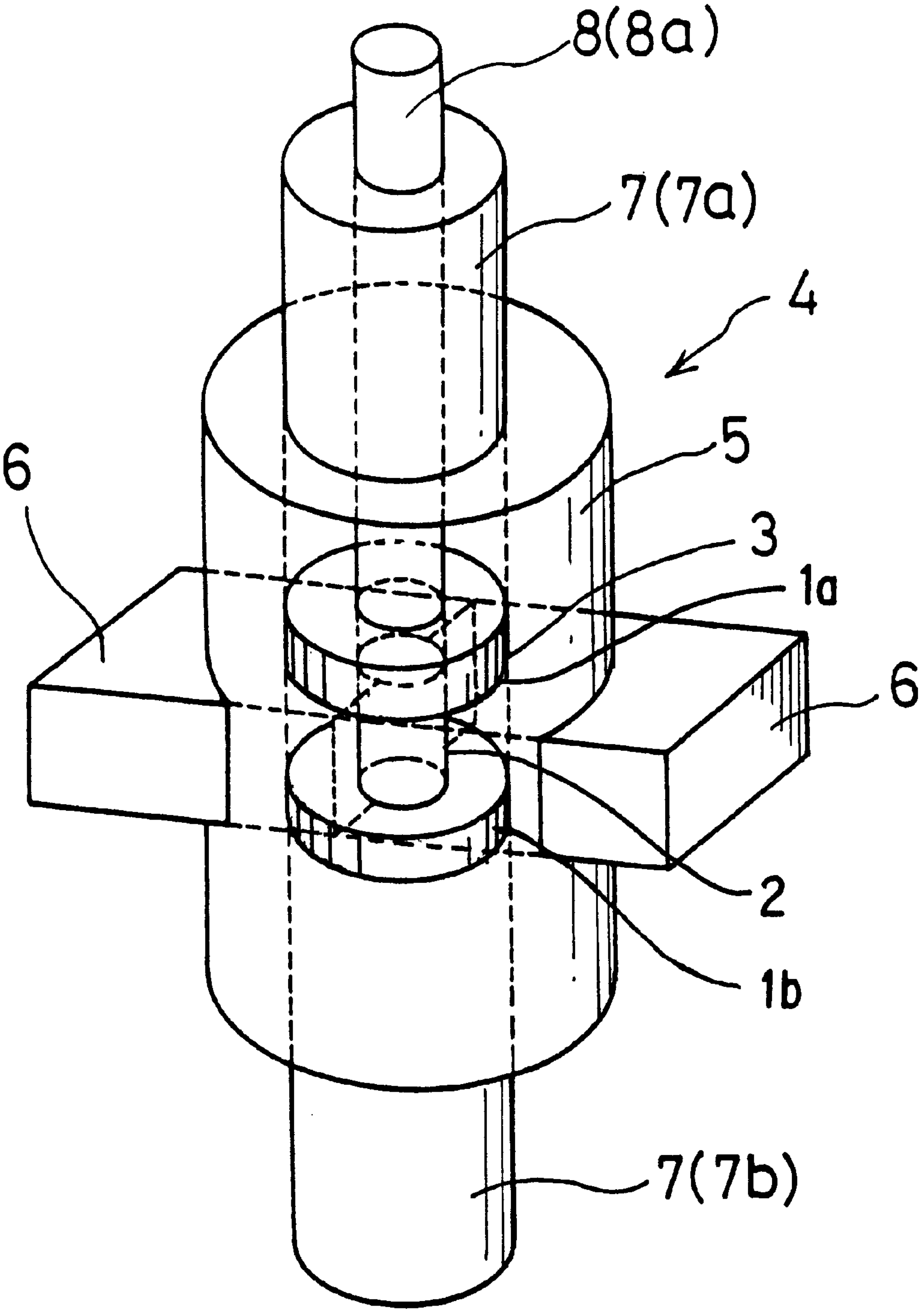
FIG. 1 is a perspective view of a mold relating to one of the embodiment of the present invention for molding a drum-shaped of magnetic core.

Hereinafter, one embodiment of the present invention is explained in detail referring to the accompanying drawings. As to the identical part or corresponding part of the conventional art, it is indicated with an identical reference character and a detailed explanation is omitted.

Figure 2:
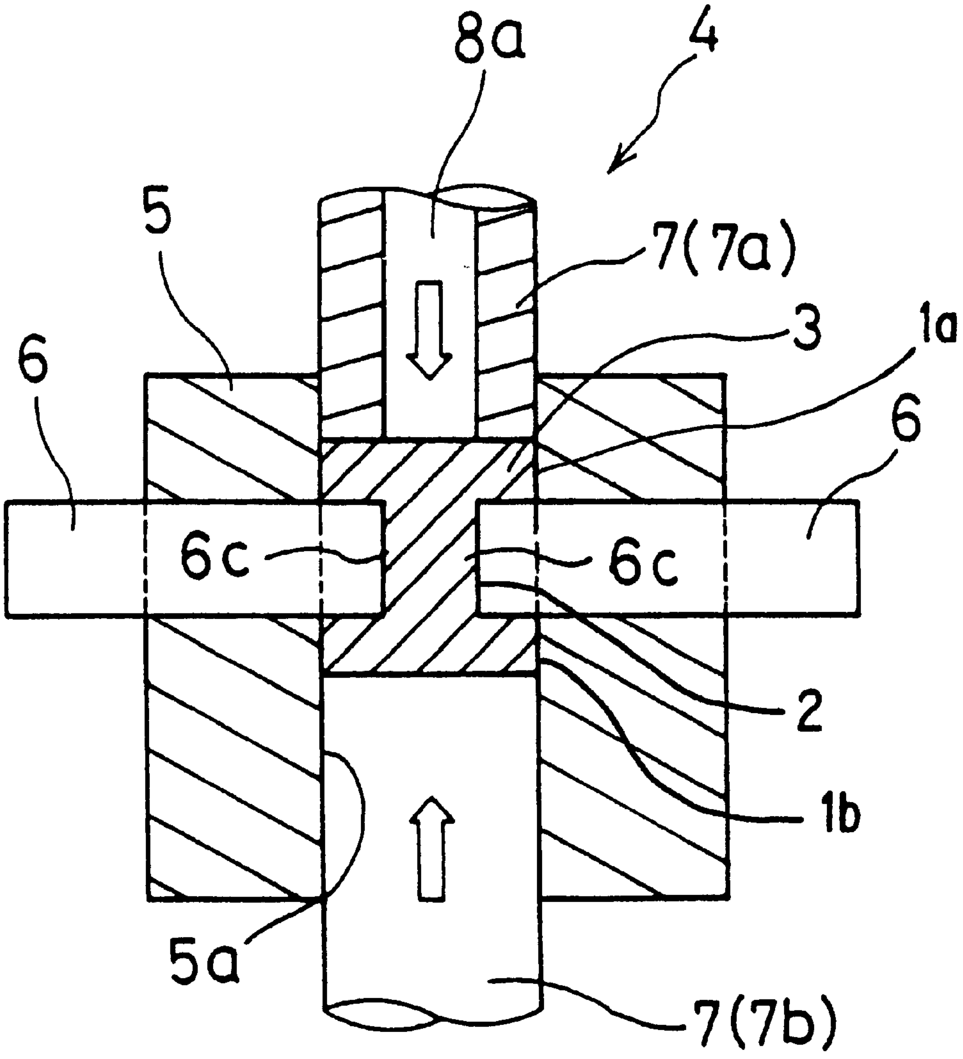
FIG. 2 is a sectional view of a mold for molding a drum-shaped of magnetic core shown in FIG. 1 in an axial direction.
Figure 3:
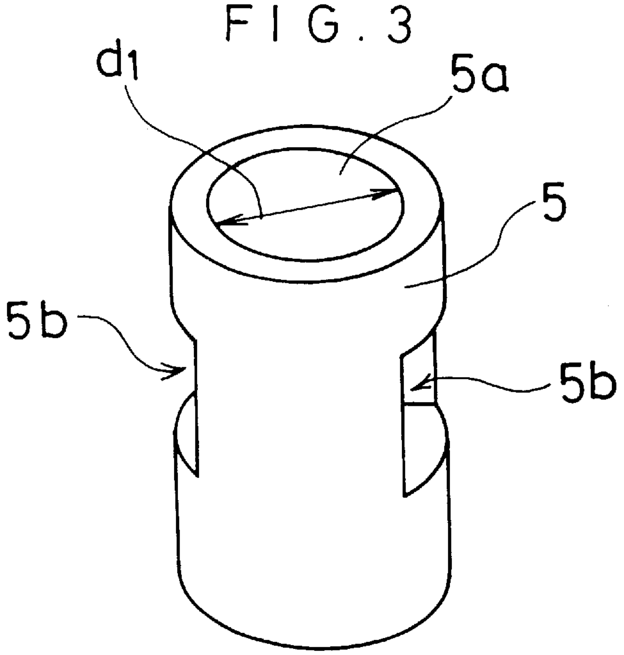
FIG. 3 is a perspective view of a die of a mold for molding a drum-shaped of magnetic core shown in FIG. 1.

In FIG. 1, a mold 4 is shown, which is related to an embodiment of the present invention wherein a drum-shaped of magnetic core is molded. Further, FIG. 2 shows a sectional view along with an axial direction of FIG. 1. This mold 4 comprises a die 5, divided dies 6, a pair of upper and lower outer punches 7*a* and 7*b*, and a central punch 8*a*. The die 5 has a cylinder-like hole 5*a*, both ends of which are opened. The diameter d, of the cylinder-like hole 5*a* shown in FIG. 3 is approximately identical with that of the flanges 1 of a magnetic core 3 to be molded. Further, at the side of the die 5 opening portions 5*b* are provided, into which divided dies are inserted.

Figure 4A:
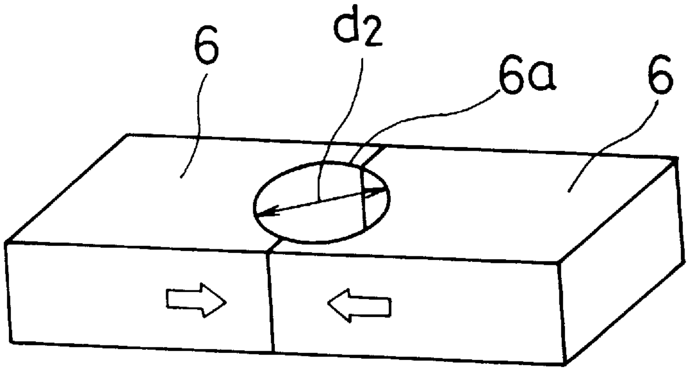
FIG. 4 shows divided dies of a mold for molding a drum-shaped of magnetic core shown in FIG. 1, and FIG. 4(*a*) is a perspective view of abutting with each other and FIG. 4(*b*) is a perspective view of being separated.
Figure 4B:
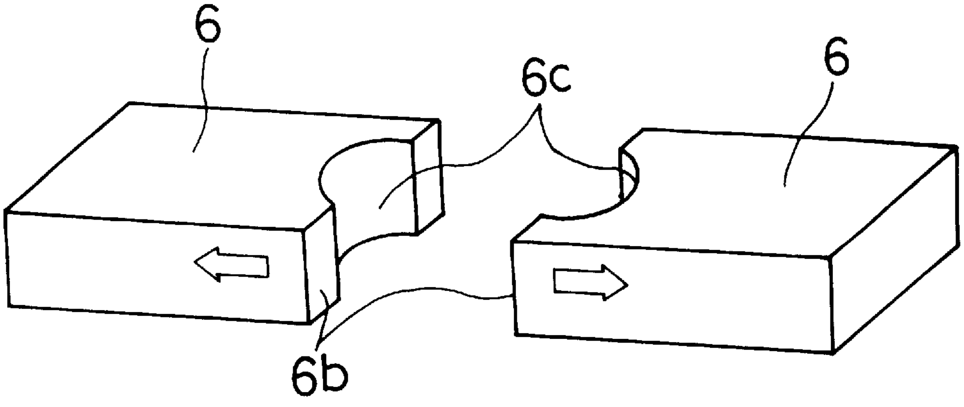

The divided dies 6 are to be inserted into the openings 5*b*. As shown in FIGS. 4(*a*) and (*b*), the divided dies 6 can be moved in a direction perpendicular to the axis of the die 5. Therefore as shown in FIG. 3, it becomes possible for the tip ends of the divided dies 6 to abut each other inside the cylinder-like hole 5a. At the tip ends 6b of the divided dies 6, there are provided two-divided cylinder-like cut outs 6c. When the tip ends 6b abut each other, a small cylinder portion 6a is formed. The diameter $d_2$ of the small cylinder portion 6a is substantially identical with the diameter $d_1$ of the diameter of the central punch 8a. Thus, the central punch 8a can be inserted in the small cylinder portion 6a.

The outer punch 7 is formed, as shown in FIGS. 1 and 2, by an outer upper punch 7a and a outer lower punch 7b. The outer upper punch 7a and the outer lower punch 7b can be inserted into the cylinder-like hole 5a from an upper portion and a lower portion of the cylinder-like hole 5a, respectively. The outer punches 7a and 7b are capable of being moved individually at the upper portion and the lower portion, respectively. When the outer punches 7a and 7b are inserted into a cavity formed by the cylinder-like hole 5a spaces are formed between the divided dies 6 and the outer upper punch 7a and the outer lower punch 7b. These spaces correspond to the dimensions of the thickness of an upper flange 1a and a lower flange 1b of the magnetic core 3 to be molded. Additionally, a cavity is formed for a drum-shaped of magnetic core by connecting the upper flange 1a and the lower flange 1b through a coil winding core portion 2. Furthermore, the outer upper punch 7a is double-structured in such a manner as the central punch 8a is coaxial disposed therein. The central punch 8a can be operated separately from the outer punch 7a and protruded freely from the tip end of the outer punch 7a.

Figure 5:
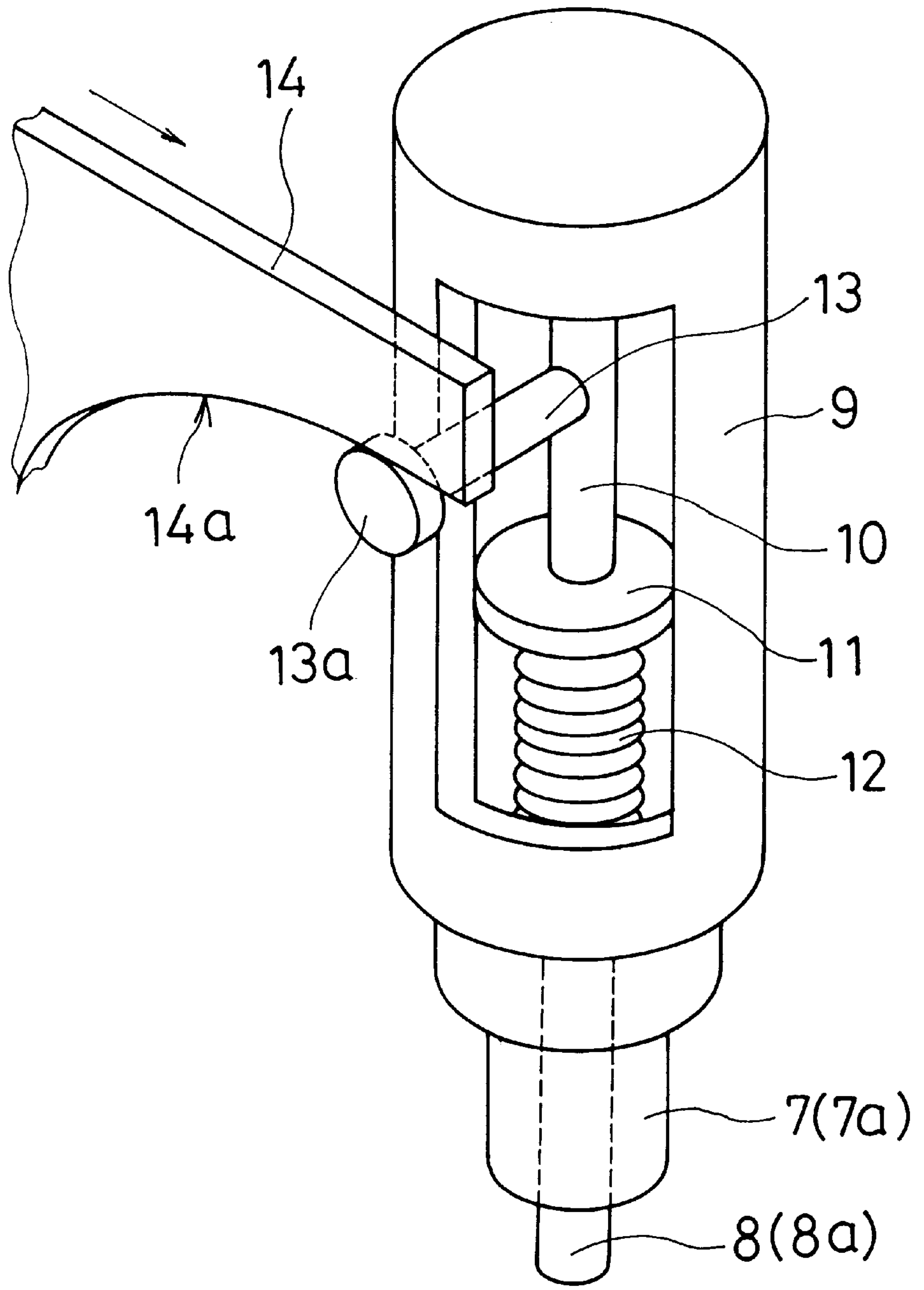
FIG. 5 is a perspective view of a mechanism for driving an outer punch and a central punch for use of a mold for molding a drum-shaped of magnetic core shown in FIG. 1.
Figure 6C:
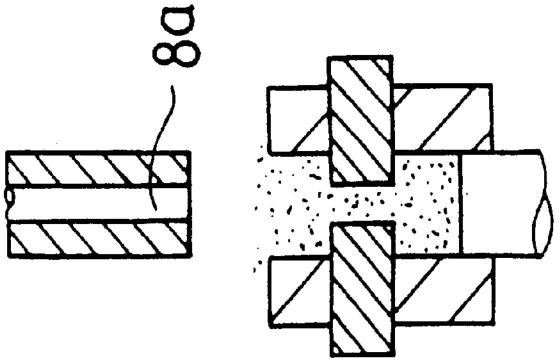
FIG. 6(*a*) is a schematic diagram showing first step of a preliminary working process for molding a drum-shaped magnetic core using the mold shown in FIG. 1.
Figure 6B:
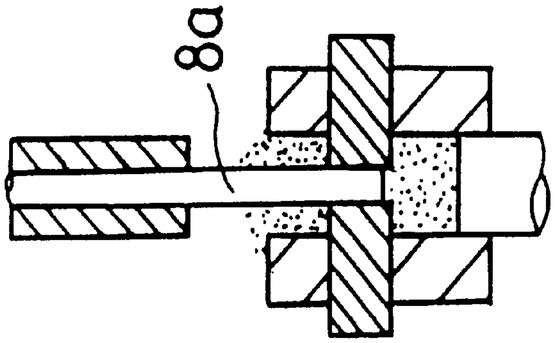
Figure 6A:
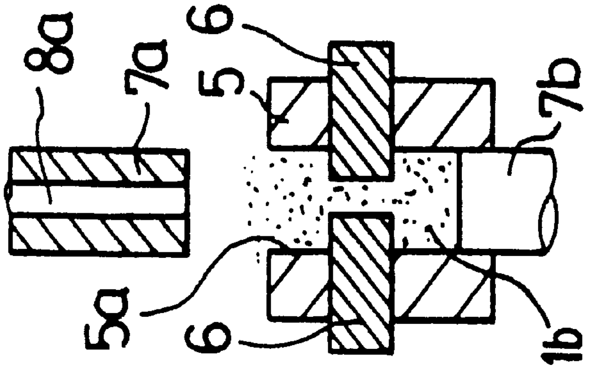
Figure 6F:
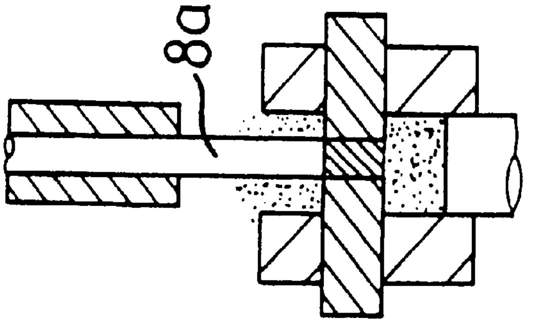
Figure 6E:
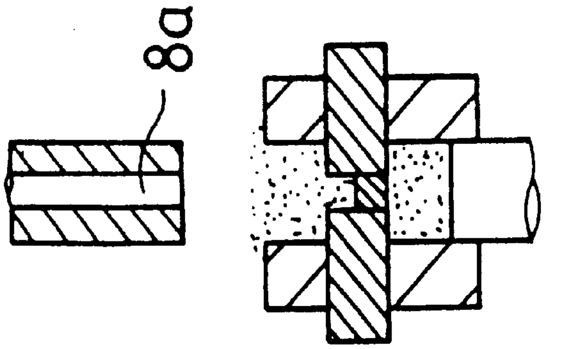
Figure 6D:
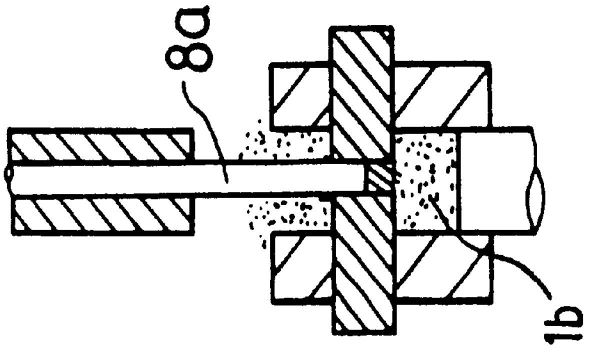

Here, a structure, in which the central punch 8a is driven free from the outer punch 7a is explained referring to FIG. 5. Above the outer punch 7a, a cylinder chamber 9 is provided. A vertically movably shaft 10 is provided inside the cylinder chamber 9. At the intermediate portion of the shaft 10, a flange 11 is formed, and between the flange 11 and a bottom surface (not shown) of the cylinder chamber 9 a coil spring 12 is disposed. Further, the shaft 10 is provided with a projection 13 and the tip end 13a of the projection 13 is in tight con act with the lower surface 14a of an arm 14. The lower surface 14a of the arm 14 is extended downward, as shown in FIG. 5, in such a manner as forming a given curve from its tip end. Further, the projection 13 is constantly biased against the lower surface 14a of the arm 14 by an extension function of the coil spring 12.

When displacing the arm 14 in an arrow direction of FIG. 5, the tip end 13a is guided along with the lower surface 14a. Thus, the shaft 10 is pushed down against the effect of the coil spring 12. Due to the unification of this shaft 10 and the central punch 8a, the central punch 8a descends in accordance with the movement of the shaft 10. When displacing the arm 14 in the direction reverse to the arrow in FIG. 5, the shaft 10 is pushed up by the effect of the coil spring 12 and the central punch 8a ascends together with the shaft 10. As obvious from this construction, the regulation of the descending stroke of the central punch 8a is carried out by the displacing amount of the arm 14 and by the shape change of the lower surface 14a.

Figure 7C:
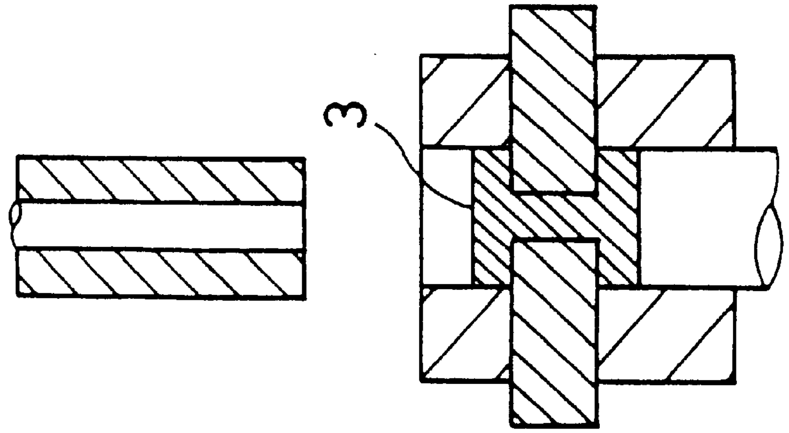
FIG. 7(*a*) is a schematic diagram showing a first step of the final working process for molding a drum-shaped magnetic core using the mold shown in FIG. 1.
Figure 7B:
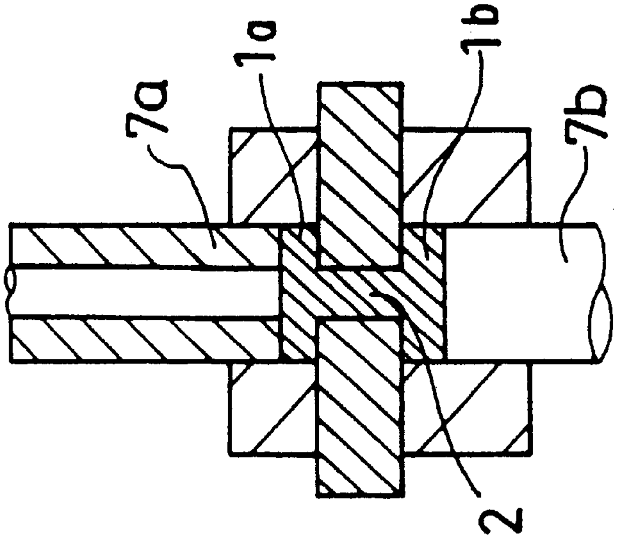
Figure 7A:
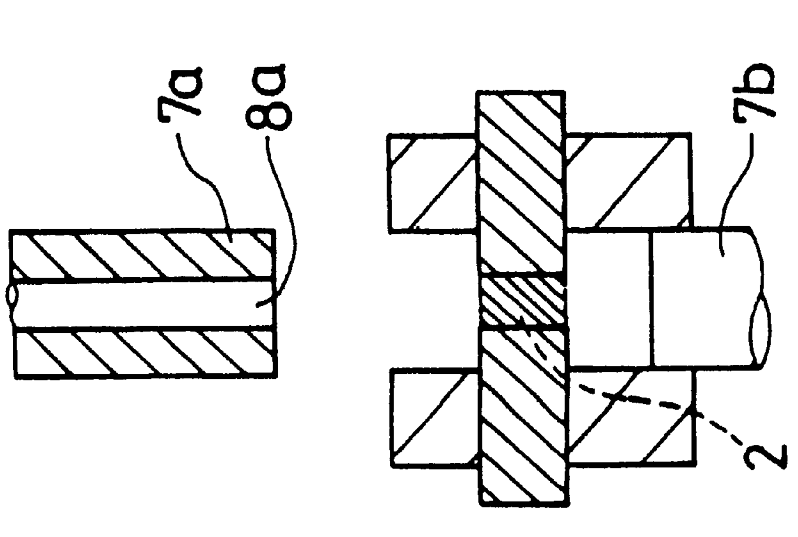
Figure 8A:
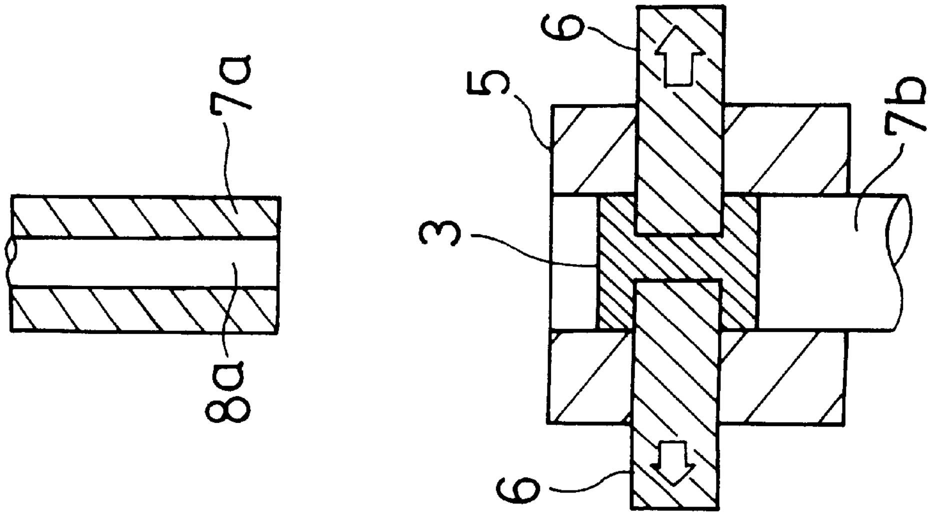
FIG. 8(*a*) is a schematic diagram showing the first step of a die-releasing process of the magnetic core of the processes for molding a drum-shaped magnetic core using the mold shown in FIG. 1.
Figure 8B:
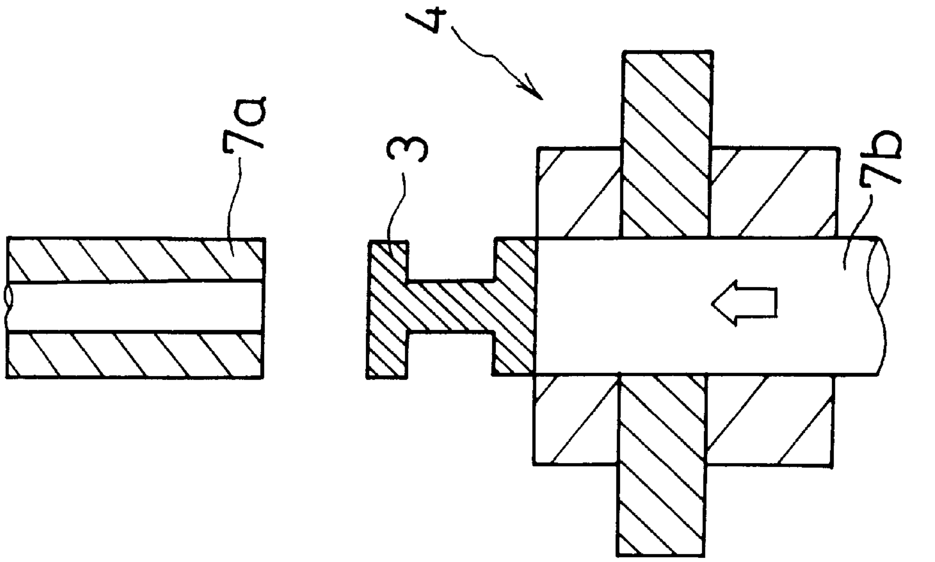
Figure 8C:
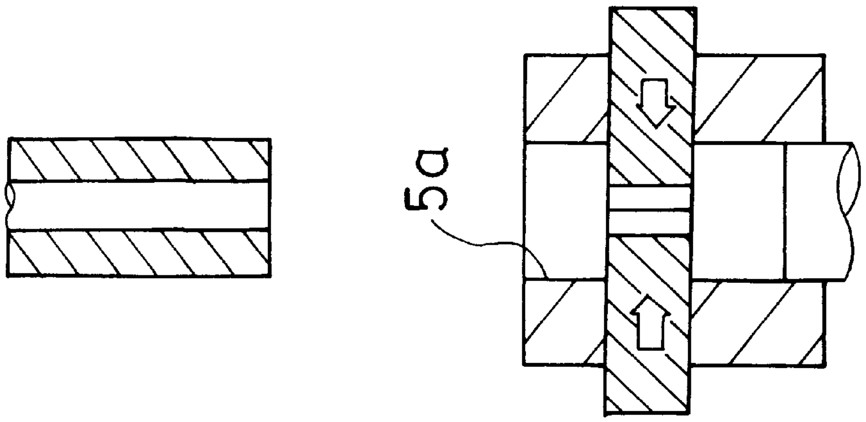
Figure 9A:
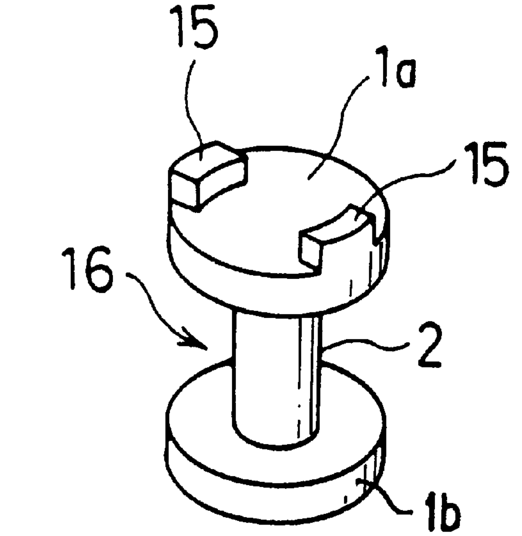
FIG. 9(*a*) shows an example of the magnetic core having a projection extending away from a top face of the flange using the mold for a drum-shaped magnetic core shown in FIG. 1.
Figure 9B:
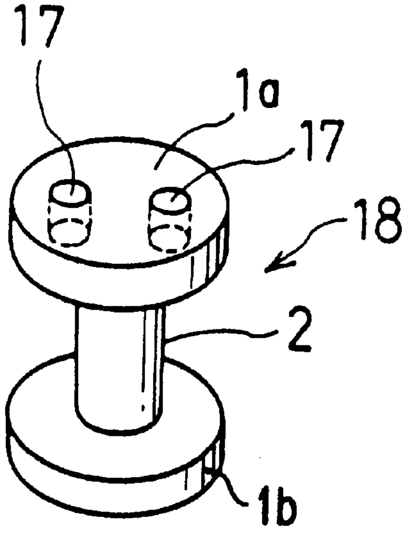
Figure 9C:
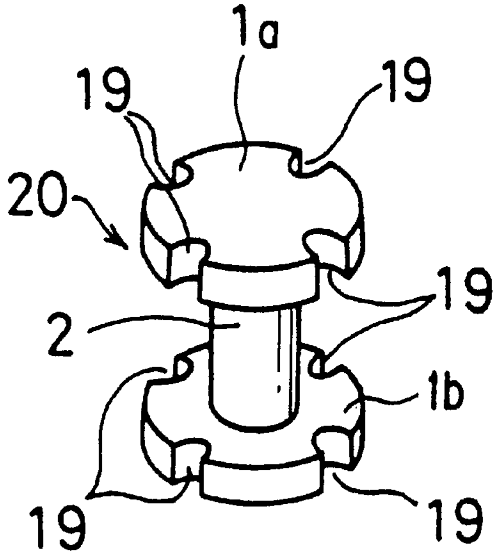
Figure 9D:
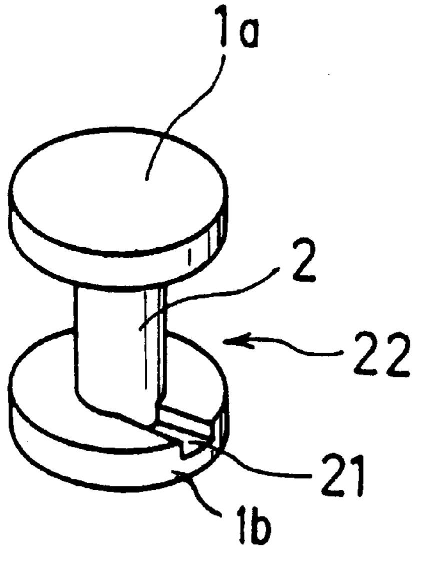

Here, one cycle of the processes of molding a magnetic core 3 relating to the embodiment of the present invention is explained by exemplifying the case where the above mold is used referring to FIGS. 6–8. In (a)–(f) of FIG. 6, the magnetic powder filling processes (preliminary compressing process) into the coil winding core portion 2 of the magnetic core 3 is indicated. In (a)–(c) of FIG. 7, the compressing process to the upper flange 1a and the lower flange 1b portion of the magnetic core 3 portion (final compressing process) is indicated. Finally, in (a)–(c) of FIG. 8, the releasing process of the mold is indicated.

First, as shown in FIG. 6(*a*), the divided dies 6 are abutted inside the cylinder-like hole 5a of the die 5. The outer punch 7b is inserted from the lower end opening portion of said cylinder-like hole 5a to form a cavity, the upper end portion of which is opened. Next, the lower flange portion the spacing between the outer punch 7b and the divided dies 6 is arranged in such a manner that the necessary amount of magnetic powder for filling the lower flange 1b portion of the magnetic core 3 to be molded can be filled. Further, the outer punch 7a located above is arranged in a standby condition at a given distance from the die 5. At this stage, the magnetic powder is filled into the cavity from the upper end of the cylinder-like hole 5a. At that time, the lower flange 1b portion is in the state where the necessary amount of the magnetic powder is not yet filled. Then, as shown in FIG. 6(*b*), only the central punch 8a, which is in a standby state, descends and is inserted in the small diameter cylinder portion 6a formed by the tip end portions 6b of the divided dies. Thus, the powder in the small diameter cylinder portion 6a is preliminarily compressed into the lower flange 1b portion.

By this operation, a sufficient amount of magnetic powder is filled in the lower flange 1b portion of the cavity. Then, as shown in FIG. 6(*c*), the central punch 8a ascends once, the magnetic powder enters into the small diameter cylinder portion 6a and the magnetic powder is filled again.

Once again, the central punch 8a descends to the middle position of the small diameter cylinder portion 6a and, as shown in FIG. 6(*d*), the magnetic powder filled in the coil winding core portion is compressed. Then, the central punch 8a ascends again (FIG. 6(*e*)). Thus, by repeating this preliminary compressing process in up and down movement, as shown in FIG. 6(*f*), the magnetic powder is pushed in the lower flange 1b portion and the coil winding core portion. By this preliminary compressing process, the coil winding core portion 2 and the lower flange 1b portion, where it is difficult to fill the magnetic powder to a given density, are compressed in advance to the desired density. Due to various shapes or molding conditions, one stroke of the central punch 8a may be sufficient to obtain the desired density of the coil winding core portion 2 and the lower flange portion.

As shown in FIG. 7(*a*), when the central punch 8a ascends after the density of the powder filled in the coil winding core portion 2 and the lower flange 1b portion reach the necessary density value, any excessive powder overflown from the cavity is swept away. Here, as shown in FIG. 7(*b*), the upper outer punch 7a, the lower outer punch 7b and the central punch 8a descend and ascend respectively to reach a given position to finally compress the magnetic powder in the upper flange 1a and the lower flange 1b portion in the axial direction to form the desired drum-shaped of magnetic core. By this final compression, the drum-shaped of magnetic core is compressed so that a uniform density is achieved throughout the drum-shaped of magnetic core. Furthermore, a desired thickness is obtained for the upper flange 1a and the lower flange 1b. Finally, as shown in FIG. 7(*c*), the outer upper punch 7a and the central punch 8a ascend.

Then, as shown in FIG. 8(*a*), while maintaining the outer punch 7a in an upper position and the central punch 8a ascended to the standby position, the divided dies 6, which are connected with the cam mechanism (not shown) of the press body (to drive the outer punch 7a), are displaced, as shown in FIG. 8(*b*), in the direction perpendicular to the coil winding core portion. Then, the magnetic core 3 having the shape of a drum is released to be pushed out from the cavity by the ascending movement of the outer punch 7b.

According to the above processes, the molding process for the magnetic core 3 finishes. Then, as shown in FIG. 8(*c*), for a next molding cycle, the separated dies 6 are once again abutted inside the cylinder-like hole 5*a* of the die 5 and the lower outer punch 7*b* descends to the given position. For reference, in FIG. 8(*b*), the lower outer punch 7*b* can remain in the given position and the die 5 can descend to release the magnetic core 3. By the above processes, one cycle of molding a magnetic core 3 using the mold 4 is finished.

Further, by using the above mold 4, the drum-shaped of magnetic core having various shapes of flanges illustrated in FIGS. 9(*a*)–(*d*) can be molded. FIG. 9(*a*) shows a magnetic core 16 having a projection 15 outside the upper flange 1*a*. Molding such a drum-shaped of magnetic core is possible by providing a concave corresponding to the projection 15 on the tip end of the outer punch 7 of the mold 4. The magnetic core 18 having a hole 17 at the upper flange 1*a,* as shown in FIG. 9(*b*), can be molded by providing a projection corresponding to the hole 17 on the tip end of the outer punch 7 of the mold 4 as shown in FIG. 2, and in FIG. 9(*c*), a magnetic core 20 which has a cut out 19 on the upper flange 1*a* and the lower flange 1*b* can be molded by using a die corresponding to the cut out 19.

Further, in FIG. 9(*d*), a magnetic core 22 having a slit 21 inside the lower flange 1*b* is indicated. This magnetic core 21 can be molded by using a projection corresponding to the slit 21 on the divided dies 6 of the mold 4 shown in FIG. 2.

Figure 10:
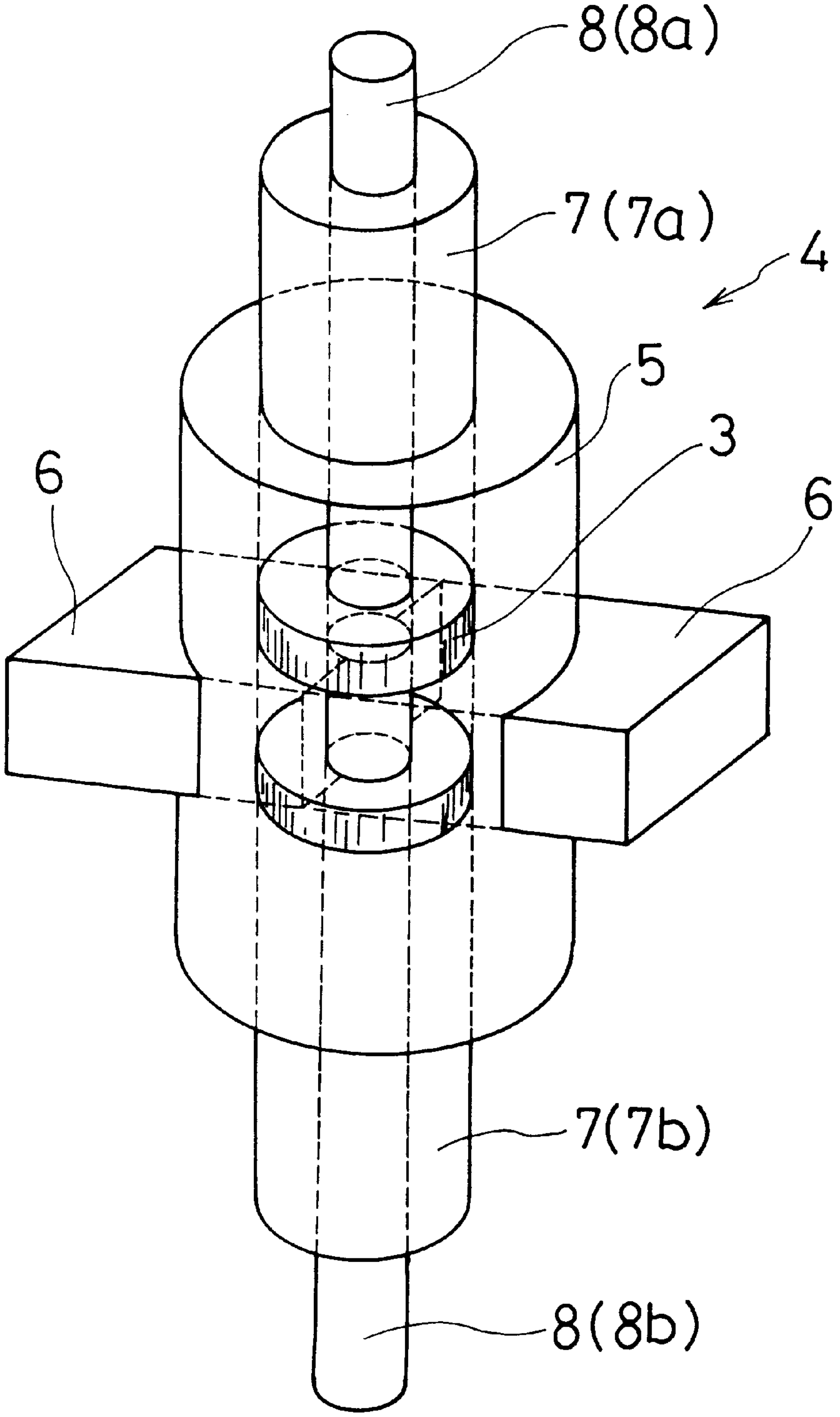
FIG. 10 is a schematic diagram of examples applied from the mold for molding a drum-shaped of magnetic core shown in FIG. 1.

Further, as shown in FIG. 10, the central punch 8 (8*a* and 8*b*) can be provided on both of the outer upper punch 7*a* and the outer lower punch 7*b,* respectively. The driving mechanism of the upper and lower central punches 8*a* and 8*b* is identical to the one shown in FIG. 5. In this case, in the preliminary compressing process (process corresponding to FIG. 6), by the up and down movement of the upper and lower central punches 8*a* and 8*b,* the density of the magnetic powder filled in the cavity is increased. Optionally, the order of the processes of up-down movement of the upper and lower punches 8*a* and 8*b* can be arranged so that the upper and lower punches 8*a* and 8*b* can move up and down in synchronization or out of synchronization. Thus, for example, while the lower central punch 8*b* is moved upward, the upper central punch 8*a* can be moved upward or downward.

Thus, according to the structure shown in FIG. 10, the following molding process of the drum-shaped of magnetic core becomes possible. In the process of molding the drum-shaped of magnetic core, the central punch 8*b* is provided at the center in the lower outer punch and the central punch 8*b* is moved up and down several times to fill the magnetic powder at a high density in the mold. Once that is accomplished, the lower central punch 8*b* is descended once and the outer lower punch 7*b* an the central punch 8*b* are descended, more magnetic powder is introduced. Then, all of the magnetic powder in the mold is compressed and molded.

Further, after moving the upper and lower central punches 8*a* and 8*b,* up and down either simultaneously or individually, once or several times, the process of compressing all of the magnetic powder in the mold using the outer upper punch 7*a* together with the central punch 8*a* and the lower outer punch 7*b* together with the central punch 8*b* can be included.

Alternatively, in the structure shown in FIG. 10, in place of the process of compressing and molding, making the outer upper punch 7*a* and the central punch 8*a* ascended, making the divided dies 6 displaced mutually left and right, and making the lower outer punch 7*b* and the central punch 8*b* ascended, the following process can be adopted. In this process, the outer upper punch 7*a* and the central punch 8*a* ascended. Then, the divided dies 6 displaced mutually left and right and the lower outer punch 7*b* and the central punch 8*b* remain in a fixed position while the die 5 descends to release the molded drum-shaped of magnetic core. the upper flange 1*a* and the lower flange 1*b* the outer upper punch 7*a* and the outer lower punch 7*b*.

Figure 11:
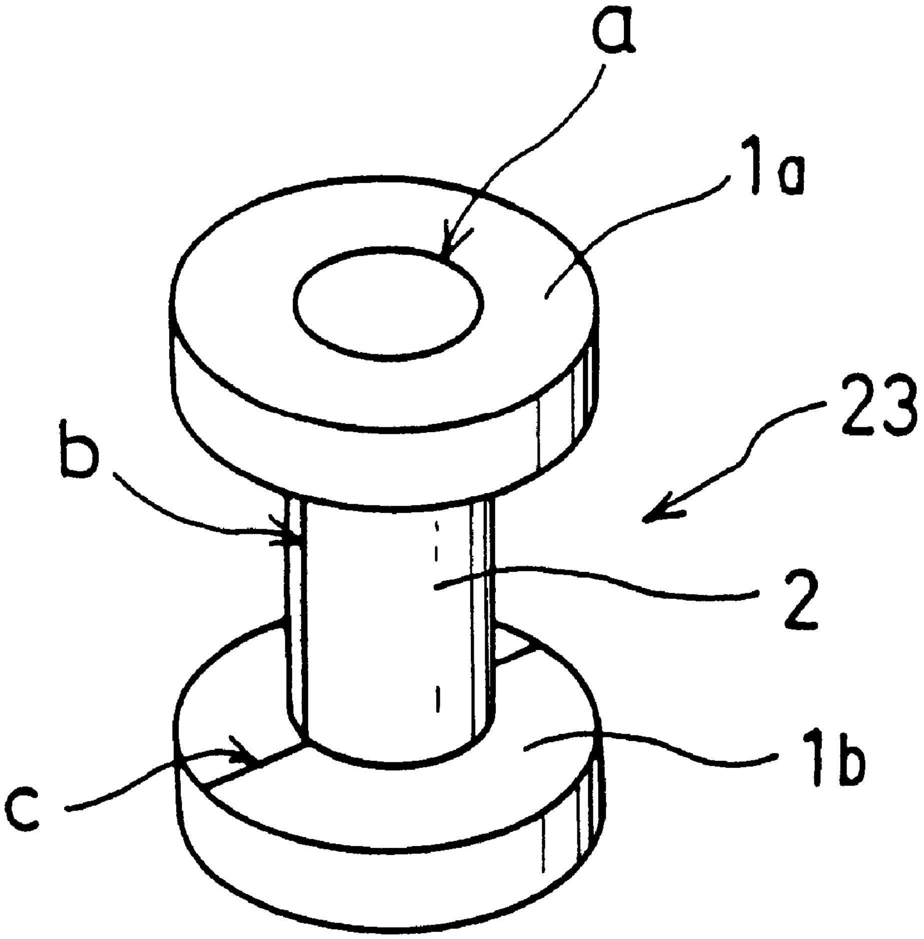
FIG. 11 is a schematic diagram of a magnetic core molded using the mold shown in FIG. 1 for molding a drum-shaped magnetic core.
Figure 12:
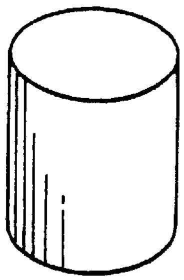
FIG.12 (RELATED ART)
FIG. 12 is a perspective view showing the first process for molding drum-shaped of magnetic core using a conventional method.
Figure 13:
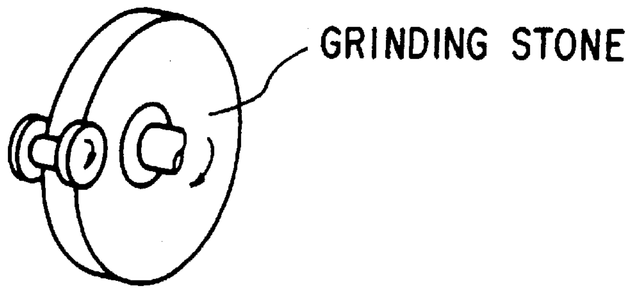
FIG.13 (RELATED ART)
FIG. 13 is a perspective view showing the second process following the first process of FIG. 12.
Figure 14:
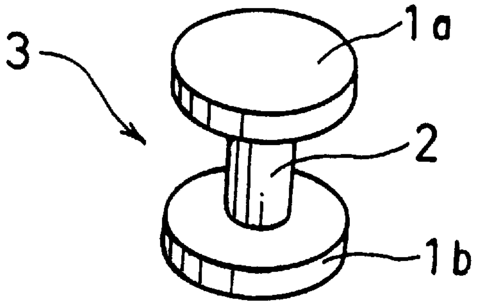
FIG.14 (RELATED ART)
FIG. 14 s a perspective view of a mold for a drum-shaped of magnetic ore through the second process of FIG. 13.
Figure 15:
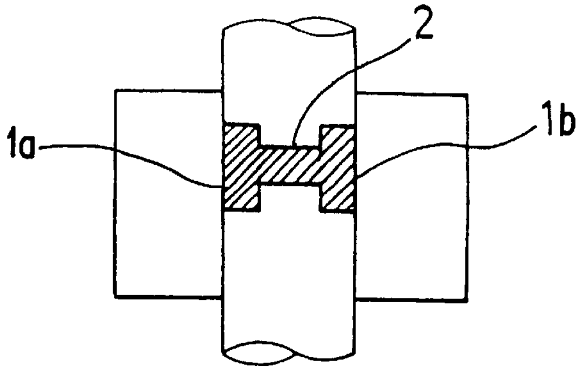
FIG. 15 (RELATED ART)
FIG. 15 is a schematic diagram showing the conventional molding manner in which a coil winding core is molded in a horizontal posture by a cavity having a shape of a drum-shaped of magnetic core.
Figure 16:
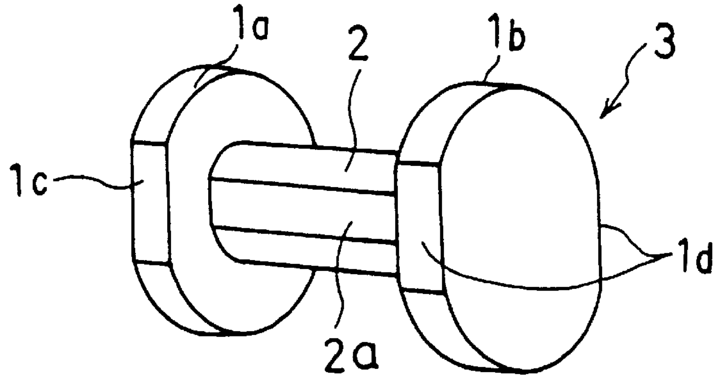
FIG. 16 (RELATED ART)
FIG. 16 s a perspective view of a drum-shaped of magnetic core molded in the method shown in FIG. 15.
Figure 17:
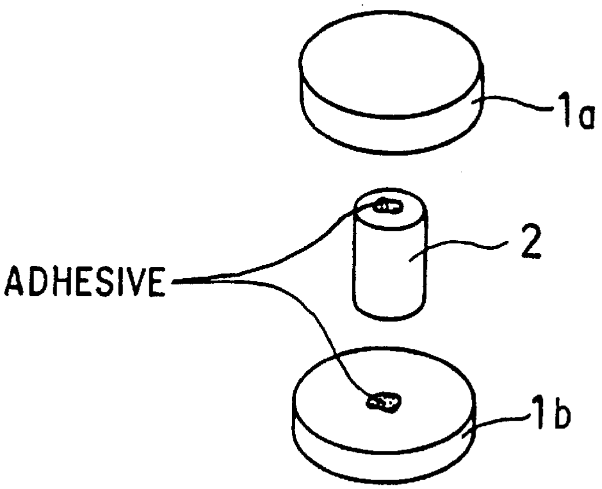
FIG. 17 (RELATED ART)

In FIG. 11, the magnetic core 23 which is molded as a drum-shaped of ferrite magnetic core in the mold 4 shown in FIG. 1 is indicated. The size of each portion of this magnetic core 23 is as follows, i.e., the diameter of the upper flange 1*a* and the lower flange 1*b* is 15 mm, the thickness of the upper flange 1*a* and the lower flange 1*b* is 3 mm, the diameter of the coil winding core portion 2 is 7 mm, and the length of the coil winding core portion 2 is 12 mm. On the upper flange 1*a,* the lower flange 1*b* and the coil winding core portion 2, there is, as shown in FIG. 11 at positions a, b and c. small steps and parting lines and so on. However, these copies of the steps and the parting lines are negligible, so that as to the assembly of the coil winding or the reliability as inductor no problem has been generated. Comparing with an average of inductance, in which ten pieces of magnetic core 23 manufactured by inventors as trial production and ten pieces of magnetic cores manufactured in conventional method, i.e., in the grinding process, the conventional products showed 150 μH and the examples showed 149 μH which is approximately identical with the former. The difference between the maximum value and the minimum value of the inductance of the examples is 5 μH, the variation of which is approximately identical with that of the conventional products.

Since the present invention is thus constituted, the following effects are expected. According to the molding method of a drum-shaped of magnetic core of the present invention, it becomes possible to compress the magnetic powder in the cavity in such a manner as the magnetic powder as a whole is compressed to a uniform density. This is accomplished by filling the magnetic powder in a cavity having a shape of a drum-shaped magnetic core, pushing the powder in the lower flange portion sufficiently using a central punch, then pushing the powder in the coil winding core portion, too, to make the density of the powder sufficient, after that, compressing the whole powder in the cavity. Furthermore, the magnetic core to be molded with the mold of this invention is different from the conventional magnetic core because in the mold of this invention does not form any shape such as having a cut portion, which may cause the properties of the inductor to deteriorate. Additionally, a magnetic core formed with the mold of this invention does not need any further processing such as cutting-work, de-burring or bonding.

There is no limitation to the shape and size as a magnetic core and it can save an excessive amount of magnetic powder to be used and can provide a drum-shaped of magnetic core at low cost and of a superior productivity.

What is claimed is:

1. A mold for molding a drum-shaped magnetic core having a cylindrical-shaped upper flange and a cylindrical-shaped lower flange, the upper and lower flanges being connected by a cylindrical-shaped coil winding core portion, the mold comprising:

a die defining a cylindrical cavity having an inner diameter equal to an outer diameter of the cylindrical-shaped upper and lower flanges for defining an outer circumference of the cylindrical-shaped upper and lower flanges of the drum shaped magnetic core, and said cylindrical cavity having openings on an axial-intermediate portion of the cylindrical cavity wall;

a pair of die inserts movable in an orthogonal direction relative to the longitudinal axis of the cylindrical cavity through the openings to define a diameter of the cylindrical-shaped coil winding core portion of the drum-shaped magnetic core wherein the diameter of the cylindrical-shaped coil winding core portion is smaller than the outer diameter of the cylindrical-shaped upper and lower flanges, and said pair of die inserts defining an upper and lower surface of each flange;

an upper punch and a lower punch, each punch being inserted into the cylindrical cavity from a corresponding end opening of the mold to form a corresponding one of the cylindrical-shaped upper and lower flanges; and a central punch disposed coaxially within one of the punches to form the cylindrical-shaped coil winding core portion, wherein the central punch is inserted into a space defining the lower flange and a space defining the cylindrical-shaped coil winding core portion.

2. The mold according to claim 1, wherein the die comprises a pair of openings to receive the pair of die inserts.

3. The mold according to claim 2, wherein at least one of a first surface and a second surface of at least one of the die inserts has a longitudinal projection for forming a corresponding longitudinal slit on an interior face of one of the flanges.

4. The mold according to claim 2, wherein each die insert includes an arcuate cut out at a tip end of the die insert, the tip end of the die insert being inserted into the opening of the die.

5. The mold according to claim 4, wherein the arcuate cut outs of the die inserts form a cylindrical portion having a die insert diameter substantially similar to the diameter of the coil winding core portion when the inserted die inserts are abutting each other.

6. The mold according to claim 1, wherein at least one of the first punch and the second punch has a projection on a contacting face, the projection forming a corresponding indentation on an exterior face of the formed flange.

7. The mold according to claim 6, wherein the corresponding indentation is a hole.

8. The mold according to claim 1, further comprising a second central punch disposed coaxially within the other of the first and second punches.

9. The mold according to claim 1, wherein the flanges each have a thickness of 3 millimeters and the outer diameter is 15 millimeters, and the diameter of the coil winding core portion is 7 millimeters and a length of the coil winding core portion is 12 millimeters.

10. A mold for molding a drum-shaped magnetic core having an upper flange and a lower flange, the upper and lower flanges being connected by a coil winding core portion, the mold comprising:

a die defining a cylindrical cavity having an inner diameter equal to an outer diameter of the upper and lower flanges for defining an outer circumference of the upper and lower flanges of the drum-shaped magnetic core, and said cylindrical cavity having openings on an axial-intermediate portion of the cylindrical cavity wall;

a pair of die inserts movable in an orthogonal direction relative to the longitudinal axis of the cylindrical cavity through the openings to define a diameter of the coil winding core portion of the drum-shaped magnetic core wherein the diameter of the coil winding core portion is smaller than the outer diameter of the upper and lower flanges, and said pair of die inserts defining an upper and lower surface of each flange; and an upper punch and a lower punch, each punch being inserted into the cylindrical cavity from a corresponding end opening of the mold to form a corresponding one of the upper and lower flanges.

* * * * *